US007107225B1

(12) United States Patent
McClung, III

(10) Patent No.: US 7,107,225 B1
(45) Date of Patent: Sep. 12, 2006

(54) BUSINESS SYSTEM

(76) Inventor: Guy L. McClung, III, 8130 Vintage Creek, Spring, TX (US) 77379

( * ) Notice: Subject to any disclaimer, the term of this patent is extended or adjusted under 35 U.S.C. 154(b) by 948 days.

(21) Appl. No.: 09/375,451

(22) Filed: Aug. 17, 1999

(51) Int. Cl.
*H04N 9/491* (2006.01)

(52) U.S. Cl. .............................. 705/14; 705/26; 705/27

(58) Field of Classification Search ................. 705/10, 705/14, 400
See application file for complete search history.

(56) References Cited

U.S. PATENT DOCUMENTS

| | | | |
|---|---|---|---|
| 4,750,119 A | 6/1988 | Cohen et al. ............... 364/401 |
| 4,941,090 A | 7/1990 | McCarthy ................... 364/405 |
| 5,128,752 A | 7/1992 | VonKohorn ................. 358/84 |
| 5,185,695 A | 2/1993 | Pruchnicki .................. 364/401 |
| 5,202,826 A | 4/1993 | McCarthy ................... 364/405 |
| 5,287,268 A | 2/1994 | McCarthy ................... 364/405 |
| 5,297,026 A | 3/1994 | Hoffman ..................... 364/408 |
| 5,341,505 A | 8/1994 | Whitehouse ................ 395/800 |
| 5,367,561 A | 11/1994 | Adler et al. ................ 379/93 |
| 5,450,938 A | 9/1995 | Rademacher ............... 194/206 |
| 5,517,406 A | 5/1996 | Harris et al. ............... 364/408 |
| 5,642,279 A * | 6/1997 | Bloomberg et al. ........... 705/14 |
| 5,664,115 A | 9/1997 | Fraser ......................... 705/37 |
| 5,689,100 A | 11/1997 | Carrithers et al. ........... 235/380 |
| 5,699,528 A | 12/1997 | Hogan ....................... 395/240 |
| 5,740,549 A | 4/1998 | Reilly et al. ................ 705/14 |
| 5,748,908 A | 5/1998 | Yu ............................... 395/244 |
| 5,761,648 A | 6/1998 | Golden et al. ............... 705/14 |
| 5,774,170 A | 6/1998 | Hite et al. .................... 348/9 |
| 5,781,894 A | 7/1998 | Petrecca et al. ............. 705/14 |
| 5,794,207 A | 8/1998 | Walker et al. ............... 705/23 |
| 5,806,044 A | 9/1998 | Powell ........................ 705/14 |
| 5,809,242 A | 9/1998 | Shaw et al. ............ 395/200.47 |
| 5,832,457 A | 11/1998 | O'Brien et al. ............. 705/14 |
| 5,845,259 A | 12/1998 | West et al. .................. 705/14 |
| 5,845,265 A | 12/1998 | Woolston ..................... 705/37 |
| 5,854,897 A | 12/1998 | Radziewicz et al. ..... 395/200.54 |
| 5,855,007 A | 12/1998 | Jovicic et al. ............... 705/14 |
| 5,857,175 A | 1/1999 | Day et al. .................... 705/14 |
| RE36,116 E | 2/1999 | McCarthy .................... 705/16 |
| 5,887,243 A | 3/1999 | Harvey et al. .............. 455/3.1 |
| 5,895,454 A | 4/1999 | Harrington .................. 705/26 |
| 5,907,830 A | 5/1999 | Engel et al. ................. 705/14 |
| 5,918,218 A | 6/1999 | Harris et al. ................ 705/37 |
| 5,933,593 A | 8/1999 | Arun et al. ............ 395/182.04 |

(Continued)

FOREIGN PATENT DOCUMENTS

GB    2 377 314    *    8/2003

OTHER PUBLICATIONS

Dialog file 148 # 08266121, Richard Halverson, "Tops Touts Subdued Attitude" Oct. 16, 1995, Discount Store News, v34, n20, p, 8 (2).*

(Continued)

*Primary Examiner*—Raquel Alvarez
(74) *Attorney, Agent, or Firm*—Guy McClung

(57) ABSTRACT

A method for guaranteeing a consumer a best price on an item purchased from a vendor in a first transaction at a first price, the method including recording the first price and information identifying the consumer, monitoring the sales price of the item for a predetermined time period after the first transaction, noting any price lower than the first price for the item during the predetermined time period, calculating a money-value difference between the first price and said any price lower than the first price, and refunding to the consumer an amount equal to the money-value difference.

14 Claims, 2 Drawing Sheets

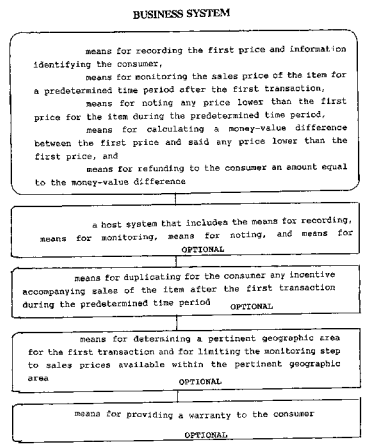

U.S. PATENT DOCUMENTS

| | | | |
|---|---|---|---|
| 5,948,061 A | 9/1999 | Merriman et al. | 709/219 |
| 5,960,411 A | 9/1999 | Hartman et al. | 705/26 |
| 5,960,882 A | 10/1999 | Polivka | 166/297 |
| 5,974,399 A * | 10/1999 | Giuliani et al. | 705/14 |
| 5,978,799 A | 11/1999 | Hirsch | 707/4 |
| 5,978,833 A | 11/1999 | Pashley et al. | 709/200 |
| 5,987,498 A | 11/1999 | Athing et al. | 709/203 |
| 5,987,508 A | 11/1999 | Agraharam et al. | 709/217 |
| 5,991,736 A | 11/1999 | Ferguson et al. | 705/14 |
| 5,991,738 A | 11/1999 | Ogram | 705/26 |
| 5,991,739 A | 11/1999 | Cupps et al. | 705/26 |
| 5,991,740 A | 11/1999 | Messer | 705/27 |
| 5,995,942 A | 11/1999 | Smith et al. | 705/14 |
| 5,995,948 A | 11/1999 | Whitford et al. | 705/41 |
| 5,999,907 A | 12/1999 | Donner | 705/1 |
| 5,999,914 A | 12/1999 | Blinn et al. | 705/26 |
| 5,999,915 A | 12/1999 | Nahan et al. | 705/27 |
| 5,999,917 A | 12/1999 | Facciani et al. | 705/36 |
| 5,999,919 A | 12/1999 | Jarecki et al. | 705/40 |
| 5,999,932 A | 12/1999 | Paul | 707/10 |
| 5,999,967 A | 12/1999 | Sundsted | 709/6 |
| 6,006,199 A | 12/1999 | Berlin et al. | 705/26 |
| 6,006,200 A | 12/1999 | Boies et al. | 705/26 |
| 6,006,205 A | 12/1999 | Loeb et al. | 705/34 |
| 6,009,408 A | 12/1999 | Buchanan | 705/11 |
| 6,009,409 A | 12/1999 | Adler et al. | 705/14 |
| 6,009,410 A | 12/1999 | LeMole et al. | 705/14 |
| 6,009,411 A | 12/1999 | Kepecs | 705/14 |
| 6,009,412 A | 12/1999 | Storey | 705/14 |
| 6,009,413 A | 12/1999 | Webber et al. | 705/26 |
| 6,009,415 A | 12/1999 | Shurling et al. | 705/35 |
| 6,014,634 A | 1/2000 | Scroggie et al. | 705/14 |
| 6,014,635 A | 1/2000 | Harris et al. | 705/14 |
| 6,014,636 A | 1/2000 | Reeder | 705/17 |
| 6,018,717 A | 1/2000 | Lee et al. | 705/13 |
| 6,018,718 A | 1/2000 | Walker et al. | 705/14 |
| 6,018,719 A | 1/2000 | Rogers et al. | 705/24 |
| 6,035,280 A | 3/2000 | Christensen | 705/14 |
| 6,035,285 A | 3/2000 | Schlect et al. | 705/30 |
| 6,035,288 A | 3/2000 | Solomon | 705/37 |
| 6,035,289 A | 3/2000 | Chou et al. | 705/37 |
| 6,058,373 A | 5/2000 | Blinn et al. | 705/26 |
| 6,070,150 A | 5/2000 | Remington et al. | 705/34 |
| 6,070,153 A | 5/2000 | Simpson | 705/36 |
| 6,076,068 A | 6/2000 | DeLapa et al. | 705/14 |
| 6,076,069 A | 6/2000 | Laor | 705/14 |
| 6,076,070 A | 6/2000 | Stack | 705/20 |
| 6,076,071 A | 6/2000 | Freeny, Jr. | 705/26 |
| 6,105,008 A | 8/2000 | Davis et al. | 705/41 |
| 6,249,772 B1 * | 6/2001 | Walker et al. | 705/26 |
| 6,269,343 B1 * | 7/2001 | Pallakoff | 705/26 |

OTHER PUBLICATIONS

Dialog file 160 # 01625279, "Montgomery Ward at its fighting weight", Minneapolis Star & Tribune, May 14, 1987, p. M;11.*

Diaolog file 160 # 02282203, "Circuit City Stores—Mrketing Procedures",1989. p. 0.*

Dialog file 15 #00618928 "Compliance: No Exception for overment Contractors" Journal of Accountancy V173n6 pp: 94-100, Jun. 1992.*

Dialog file 810 # 0795255, "Office Depot: Office Depot Online Open for Business", Jan. 15, 1998, Business/Retail Editors and Internet/On-Line Writers.*

How To Use ValuPage, Super Markets Online, Inc., Feb, 23, 1999.

AOL's Steve Case Brings Coupons To The Internet, New York Post, 1998.

Ultrafinder, Ultradata Systems, Inc., U.S. News & World Report, p. 85, Jun. 28, 1999.

What's New At Prio, Prio, Inc., 1999.

Prio-Home, Prio, Inc., May 13, 1999.

Save Smart Sofware to Undertake Product Software, SaveSmart Software India, Oct. 5, 1999.

U.S. Official Gazette Patents—entries for U.S. Pats. 5,913,210 and 5,913,211, Jun. 15, 1999.

U.S. Official Gazette Patents—entry for U.S. Patent 5,903,874, May 11, 1999.

U.S. Official Gazette Patents—entry for U.S. Patent 5,894,520, Apr. 13, 1999.

Info space.com To Acquire Saraide, Prio: Dec. 6, 1999.

Preferred Savings Card, Sears, Nov. 15, 1999.

Computer and Software News, V3, n12, p. 26, Mar, 25, 1985; "Murphy's Mart Uses Handleman for All Software", Abstract, Dialog file 275, No. 01115510.

Annual Report, 1989, "Luskin's—Marketing Procedures"; Dialog file 16, No. 02276566.

Seymour, Jim; "Corporate Buyers Deserve Price Protection", PC Week, v8, n49, p. 69, Dec. 1991; Dialog file 275, No. 01461988, Full Text article.

Freedman, Beth; "IBM makes moves to shore up dealer support", PC Week v3, n15, p. 148; Apr. 15, 1986 Dialog file 275, No. 01176015, Full Text article.

McConville, James A.; "New Beachheads"; HFD—The Weekly Home Furnishings Newspaper, V67, n39, p. 89 Sep. 27, 1993, Dialog file 148, No. 05519377, Full Text.

Int'l Search Report, PCT/US00/22406, Dec. 13, 2000, PCT counterpart of U.S. Appl. No. 09/375,451.

* cited by examiner

FIG. 1

BUSINESS SYSTEM means for recording the first price and information identifying the consumer, means for monitoring the sales price of the item for a predetermined time period after the first transaction, means for noting any price lower than the first price for the item during the predetermined time period, means for calculating a money-value difference between the first price and said any price lower than the first price, and means for refunding to the consumer an amount equal to the money-value difference

--- a host system that includes the means for recording, means for monitoring, means for noting, and means for
OPTIONAL

--- means for duplicating for the consumer any incentive accompanying sales of the item after the first transaction during the predetermined time period    OPTIONAL

--- means for determining a pertinent geographic area for the first transaction and for limiting the monitoring step to sales prices available within the pertinent geographic area
OPTIONAL

--- means for providing a warranty to the consumer
OPTIONAL

FIG. 2

BUSINESS SYSTEM means for guaranteeing a consumer a best price on an item purchased from the vendor in a first transaction at a first price means for recording the first price and information identifying the consumer means for monitoring the sales price of the item for a predetermined time period after the first transaction.

means for noting any price lower than the first price for the item during the predetermined time period, means for calculating a money-value difference between the first price and said any price lower than the first price means for refunding to the consumer an amount equal to the money-value difference

BUSINESS SYSTEM

BACKGROUND OF THE INVENTION

1. Field of the Invention

This invention relates to improvements to business systems with which a customer can be in direct electronic communication with a vendor, e.g., via a system such as the Internet global communications system. In certain aspects, this invention relates to such systems that also provide guaranteed pricing for a predetermined time period so that a consumer is assured that an item purchased will not be sold in the near future at a discount or sale price which is not made available to the consumer.

2. Description of Related Art

Filed on even date herewith is the application entitled "Business System" naming Sunil Thakur and Zulfiqar Momin as inventors. This application is incorporated fully herein for all purposes including its discussion of Related Art.

There has long been a need, recognized by the present inventor, for a system that provides to a consumer the assurance that the consumer will not buy an item or service and then find out in the near future that the item or service was made available at a much lower price. There has long been a need for such a system usable with Internet business systems and network systems.

SUMMARY OF THE PRESENT INVENTION

The present invention, in certain aspects, provides a system that, in certain aspects, includes any of the systems and/or methods disclosed in the previously-mentioned "Business System" patent application, additionally with the following: a method in which a vendor who sells a business or service to a consumer maintains a record of the sale and monitors that item (or service) for a preset time period (e.g., but not limited to, for a week, a month, three months, six months, or a year). If the item is offered at a lower price then the consumer paid, or for sale within the preset time period with any additional new incentive and/or at a lower cost than that paid by the consumer, the consumer is automatically given a refund, a credit, and/or a coupon or certificate good for use equal to the difference in sales prices and/or including value for the new incentive. Alternatively, the vendor may make available a refund, etc. of lesser or of more value than the price difference. Alternatively, a host system or any centralized system as disclosed in the "Business System" patent application (or in any prior art system cited therein) may record the sale, monitor the vendor and the product (or service) for the preset time period, and handle the making available of the refund, etc. to the consumer.

In other embodiments, the vendor (and/or host system or other system) monitors all vendors of such an item; monitors all vendors of such an item in a pertinent geographic area as defined in the "Business System" patent application; and/or monitors all providers of the item as identified by the manufacturer thereof. In certain aspects, the consumer is alerted to the fact that a refund is available or that a refund has been made by phone, by fax; and/or by email. In one embodiment, a consumer using a host system or similar system is automatically notified of such a refund, etc. upon logging on to the host system, e.g., but not limited to by a blinking icon or message such as "You've Got Refund$." In one aspect, when a consumer has an account with the vendor (or an account with the host system or similar system), the account is automatically credited with the refund amount.

Such a blinking icon and/or message may also be used with the methods of the "Business System" patent application to alert a consumer to: a retirement account contribution (e.g. but not limited to "You've Got IRA$"; "You've Got Retirement $"; or simply "Retirement $"); an available coupon (e.g. but not limited to "You've Got Coupons"; "You've God Coupon $"; or simply "Coupons" or "Coupon $"); future rewards or future "bucks" (e.g. but not limited to "You've God Future rewards;" "You've Got Futurereward$"; "You've Got Futurebucks;" "You've Got Futurebuck$"; "Futurerewards"; "Futurereward$"; "Futurebucks"; "Futurebuck$"; "You've Got Discounts"; "You've Got Discount$"; "Discounts" or "Discount$".

In certain embodiments a price guaranteeing system according to the present invention can also monitor the vendor's competitors and guarantee to a consumer that if any competitor offers a lower price (and/or new incentive), the consumer will get the benefit of the competitor's lower price. In one aspect, the vendor (and/or host system or similar system) monitors competitors on a real time basis and provides the consumer at the vendor's location any better price available then at any competitor for the same item (or service). In one aspect such a method includes making available presenting to the consumer any coupon, rebate, incentive etc. offered by a competitor. Such "incentive matching" can be limited, in certain embodiments, to a pertinent geographic area.

Any method and system according to the present invention may also be in communication with and part of any airline's frequent flyer mile program so that sales and refunds, etc. qualify for miles. To alert a consumer that miles have been earned related to a transaction, a blinking icon or message as described above may be used, e.g., but not limited to "Miles"; "You've Got Miles"; and "Mile$".

In one aspect a host system or similar system (e.g. but not limited to as in the "Business System" patent application and any prior art system disclosed therein) maintains a listing of vendor's that subscribe to and use the host system (or other system). When a consumer is afforded a refund, etc. based on a competitor's offerings, the host system can contact the competitor informing it that the competitor's offering was used as a refund basis and making available to the competitor a subscription for the host system.

In another aspect, whenever a consumer uses the host system or other system for any inquiry and/or transaction, the host system can contact any non-subscribing vendor that offers such a product or service and alert them to the fact that a sale was missed, then offer the non-subscribing vendor a subscription or sign-up agreement.

In other embodiments any system and method described herein may include the following (or any Internet system may use the following): when a consumer makes a purchase via the system, warranty information and/or warranty sign-up processing may be made available to the consumer by phone, by fax, by email, and/or via an interactive Internet site. A blinking icon or message as discussed above may be used to alert a consumer regarding warranties, e.g., but not limited to "Warranty !"; "Warranties"; "Warranty$"; "You've Got Warranty"; or "You've Got Warranty$". The consumer can, via an interactive Internet site (e.g. of the host system, the vendor, other systems, and/or the manufacturer) provide the sales and product information to activate the warranty. Similarly, by phone, fax, email, and/or interactive Internet site, a consumer can be alerted to possible warranty extensions and/or renewals and can apply for them.

What follows are some of, but not all, the objects of this invention. In addition to the specific objects stated below for at least certain preferred embodiments of the invention, other objects and purposes will be readily apparent to one of skill in this art who has the benefit of this invention's teachings and disclosures. It is, therefore, an object of at least certain preferred embodiments of the present invention to provide:

New, useful, unique, efficient, nonobvious systems and methods for providing direct electronic consumer/vendor contact for business transactions via a system such as the Internet global communications system;

New, useful, unique, efficient, nonobvious systems and methods for providing to a consumer guaranteed best pricing for a present sale and/or for a preset future time period;

Such business methods and/or coupon methods which include defining a particular geographic area of interest to a consumer;

Such methods which make refunds, etc., available to consumers even if they are unaware of them;

Such methods which a consumer can avail him or herself of via a host system and/or via an Internet network; and Such methods and systems which automatically apply a refund to a system user's account.

Certain embodiments of this invention are not limited to any particular individual feature disclosed here, but include combinations of them distinguished from the prior art in their structures and functions. Features of the invention have been broadly described so that the detailed descriptions that follow may be better understood, and in order that the contributions of this invention to the arts may be better appreciated. There are, of course, additional aspects of the invention described below and which may be included in the subject matter of the claims to this invention. Those skilled in the art who have the benefit of this invention, its teachings, and suggestions will appreciate that the conceptions of this disclosure may be used as a creative basis for designing other structures, methods and systems for carrying out and practicing the present invention. The claims of this invention are to be read to include any legally equivalent devices or methods which do not depart from the spirit and scope of the present invention.

The present invention recognizes and addresses the previously-mentioned problems and long-felt needs and provides a solution to those problems and a satisfactory meeting of those needs in its various possible embodiments and equivalents thereof. To one skilled in this art who has the benefits of this invention's realizations, teachings, disclosures, and suggestions, other purposes and advantages will be appreciated from the following description of preferred embodiments, given for the purpose of disclosure, when taken in conjunction with the accompanying drawings. The detail in these descriptions is not intended to thwart this patent's object to claim this invention no matter how others may later disguise it by variations in form or additions of further improvements.

DESCRIPTION OF THE DRAWINGS

A more particular description of embodiments of the invention briefly summarized above may be had by references to the embodiments which are shown in the drawings which form a part of this specification. These drawings illustrate certain preferred embodiments and are not to be used to improperly limit the scope of the invention which may have other equally effective or legally equivalent embodiments.

FIG. 1 is a schematic view of a system according to the present invention.

FIG. 2 is a schematic view of a personal computer useful with a system according to the present invention.

DESCRIPTION OF EMBODIMENTS PREFERRED AT THE TIME OF FILING FOR THIS PATENT

The present invention, in certain preferred embodiments, provides a method for guaranteeing a consumer a best price on an item (or for a service) purchased from a vendor (either over a computer network or host system or at a vendor location) in a first transaction at a first price, the method including recording the first price (on paper or on a computer system or computer memory) and information identifying the consumer, monitoring the sales price of the item for a predetermined time period after the first transaction, noting any price lower than the first price for the item during the predetermined time period, calculating (either manually, by calculator, and/or by computer) a money-value difference between the first price and said any price lower than the first price, and refunding (in cash in hand paid; by crediting a consumer's account; by providing coupons or certificates; and/or by making the amount available to the consumer either on-line or at a vendor location) to the consumer an amount equal to the money-value difference. The method can be done manually with paper records; on a suitably programmed computer and/or computer system or network; and/or via a host system or any other system, e.g. but not limited to as described in the "Business System" patent application or in any prior art system discussed therein.

In certain aspects, the guaranteed pricing is in effect for only one or two price changes. In other aspects, the guaranteed pricing is in effect throughout the entire preset time period and all lower prices will be applied. The "any price lower than the first price" can be limited to any lower price offered by the particular vendor involved in the first transaction and/or can be limited to a lower price that becomes available in a pertinent geographic area. Alternatively, the "any lower price" can be based on a preset group of vendors including competitors of the vendor involved in the first transaction, or all suppliers of the item (or service), e.g. but not limited to city-wide, state-wide, country-wide, or world-wide.

In certain aspects, methods as described above can include alerting a consumer regarding a refund based on a new lower price.

Consumers can be alerted, e.g. by phone, fax, email, and/or via an interactive Internet site, e.g. but not limited to with a host system or other system (e.g. or in the "Business System" patent application and in any prior art system disclosed therein). Methods according to the present invention can also take into account new incentives to buy the item that was the subject of the first transaction (e.g. frequent flyer miles, discounts on other items or services, rebates, coupons for the same or other items or services in the future, cheaper or free warranties or extended warranties, etc.). A money-value is assigned to the new incentive and this is made available to the consumer and/or, if possible, the actual new incentive itself. The refunds, etc. and/or new incentives can be made available and/or paid for by a vendor, a host system or other similar system, a manufacturer, and/or a third party administrator of a host system.

The present invention, therefore, discloses in some, but not necessarily all embodiments, a business system for guaranteeing a consumer a best price on an item purchased from a vendor in a first transaction at a first price, the system as shown in FIG. 1 including means for recording the first price and information identifying the consumer, means for monitoring the sales price of the item for a predetermined time period after the first transaction, means for noting any price lower than the first price for the item during the predetermined time period, means for calculating a money-value difference between the first price and said any price lower than the first price, and means for refunding to the consumer an amount equal to the money-value difference; and, optionally, a host system that includes the means for recording, means for monitoring, means for noting, and means for calculating; means for duplicating for the consumer any incentive accompanying sales of the item after the first transaction during the predetermined time period; means for determining a pertinent geographic area for the first transaction and for limiting the monitoring step to sales prices available within the pertinent geographic area; and/or means for providing a warranty to the consumer.

The present invention, therefore, discloses in some, but not necessarily all embodiments, a business system with a magnetic strip card with consumer identifying information encoded thereon said information identifying a consumer desiring to conduct a transaction with a vendor, a host system that maintains information about discounts from said vendor, an apparatus for reading information on the magnetic strip card, said apparatus interconnected with and in communication with the host system, and means for applying any applicable discount related to said transaction for the benefit of said consumer, improvements as shown in FIG. 2 including means for guaranteeing a consumer a best price on an item purchased from the vendor in a first transaction at a first price, said means further including means for recording the first price and information identifying the consumer, means for monitoring the sales price of the item for a predetermined time period after the first transaction, means for noting any price lower than the first price for the item during the predetermined time period, means for calculating a money-value difference between the first price and said any price lower than the first price, and means for refunding to the consumer an amount equal to the money-value difference.

The present invention therefore, in certain embodiments, provides improvements for a method for generating vendor information including contacting a host system by a consumer, identifying a pertinent geographic area of interest to the consumer, identifying at least one vendor doing business in the pertinent geographic area, retrieving from the host system information related to the at least one vendor, and displaying said information for the consumer; and in one aspect such a method includes automatically displaying and/or downloading to a computer the information to the consumer—the improvements including providing a method to guarantee to the consumer a better price or a best price on items or services purchased from the vendor for a predetermined time period following a transaction.

The present invention therefore, in certain embodiments, provides improvements for a method for a vendor to provide a future discount to a customer of the vendor, the method including noting a transaction amount indicative of value of a transaction between the customer and the vendor, based on the transaction amount, calculating a discount amount to be applied to a future transaction between the customer and the vendor, storing the discount amount for future use, and informing the customer of the discount amount;

and such a method including applying the discount amount to a future transaction of the customer—the improvements including providing a method to guarantee to the consumer a better price or a best price on items or services purchased from the vendor for a predetermined time period following a transaction.

The present invention therefore, in certain embodiments, provides improvements for a method for making a contribution to a retirement account of a customer of a vendor, the method including noting a transaction amount indicative of value of a transaction between the customer and the vendor, based on the transaction amount, calculating a contribution amount to be made to a retirement account of the customer, and making a contribution to the customer's retirement account in the amount of the contribution amount; and such a method wherein the vendor, the customer, a third party administrator and/or a host system make the contribution to the retirement account—the improvements including providing a method to guarantee to the consumer a better price or a best price on items or services purchased from the vendor for a predetermined time period following a transaction.

The present invention therefore, in certain embodiments, provides improvements for a method for generating a coupon including contacting a host system by a consumer, identifying a pertinent geographic area of interest to the consumer, identifying at least one vendor doing business in the pertinent geographic area, retrieving from the host system information related to the at least one vendor and at least one coupon currently provided by the at least one vendor, and generating a coupon corresponding to the at least one coupon—the improvements including providing a method to guarantee to the consumer a better price or a best price on items or services purchased from the vendor for a predetermined time period following a transaction.

The present invention discloses, in at least some if not all embodiments, improvements for a business system with a magnetic strip card with consumer identifying information encoded thereon said information identifying a consumer desiring to conduct a transaction with a vendor, a host system that maintains information about discounts from said vendor, an apparatus for reading information on the magnetic strip card, said apparatus interconnected with and in communication with the host system, and means for applying any applicable discount (coupon, rebate, sales price, volume discount, reward, etc.) related to said transaction for the benefit of said consumer—the improvements including providing a method to guarantee to the consumer a better price or a best price on items or services purchased from the vendor for a predetermined time period following a transaction. Such a system may have one, some, or all of the following in any combination: wherein the apparatus for reading the information is located at a location of the vendor; wherein the apparatus for reading the information is located at a location of the consumer; a computer at the location of the consumer for the consumer to communicate with the host system; means for automatically downloading information to the computer without a request from the consumer; means at the host system for receiving from the vendor transaction information about said transaction, and means at the host system for storing said transaction information; means for calculating a future discount for the consumer based on the transaction information; means for providing the consumer with information about the future discount; means for calculating an amount of a retirement account contribution for a consumer based on the transaction information; means for making a contribution to a retirement account of the consumer based on the calculated amount (e.g. but not limited to a contribution made by a third party administrator, by the vendor, by the host system, or by the consumer); means for providing the consumer with a physical coupon for use in a transaction with the vendor; means for determining a pertinent geographic area for the consumer (e.g. but not limited to, based on phone number, zip code, and/or information inputted by a consumer); means for displaying for the consumer information about the vendor for the determined pertinent geographic area (which may be reduced or enlarged in scope by the consumer); means for displaying for the consumer information about a desired product or service available in the pertinent geographic area; means for automatically determining the pertinent geographic area based on information about a consumer, e.g. but not limited to a phone number used by the consumer to contact the host system; wherein the information about the consumer includes a phone number used by the consumer to contact the host system and/or a zip code of the consumer' location; wherein the consumer uses the Internet global communications system or some other similar communications network to contact the host system; and/or means for automatically downloading to the computer information about a vendor without a request from the consumer.

In conclusion, therefore, it is seen that the present invention and the embodiments disclosed herein and those covered by the appended claims are well adapted to carry out the objectives and obtain the ends set forth. Certain changes can be made in the subject matter without departing from the spirit and the scope of this invention. It is realized that changes are possible within the scope of this invention and it is further intended that each element or step recited in any of the following claims is to be understood as referring to all equivalent elements or steps. The following claims are intended to cover the invention as broadly as legally possible in whatever form it may be utilized. The invention claimed herein is new and novel in accordance with 35 U.S.C. § 102 and satisfies the conditions for patentability in § 102. The invention claimed herein is not obvious in accordance with 35 U.S.C. § 103 and satisfies the conditions for patentability in § 103. This specification and the claims that follow are in accordance with all of the requirements of 35 U.S.C. § 112. The inventors may rely on the Doctrine of Equivalents to determine and assess the scope of their invention and of the claims that follow as they may pertain to apparatus not materially departing from, but outside of, the literal scope of the invention as set forth in the following claims.

What is claimed is:

1. A method for guaranteeing a consumer a best price on an item purchased from a vendor in a consummated final first transaction at a first price, the method comprising
    recording the first price and information identifying the consumer;
    monitoring the sales price of the item for a predetermined time period after purchase of the item by the consumer in the consummated final first transaction;
    noting any price lower than the first price for the item during the predetermined time period following the purchase of the item;
    calculating a money-value difference between the first price and said any price lower than the first price;
    refunding to the consumer an amount equal to the money-value difference;
    wherein the item is purchased via a host system and the host system records the first price and information identifying the customer; the host system conducts the monitoring, noting, and calculating steps; and the host system provides the refund to the consumer;
    wherein the host system provides the refund by crediting an account of the consumer; and
    wherein only prices for the item to be sold by the vendor involved in the first transaction are taken into account in the noting step.

2. The method of claim 1 wherein the item is purchased by the consumer at a location of the vendor.

3. The method of claim 1 wherein the item is purchased by the consumer on-line via a network system.

4. The method of claim 1 wherein the account is an account of the consumer with the host system.

5. The method of claim 1 wherein a refund is made for each subsequent sales price lower than the first price.

6. The method of claim 1 further comprising
    monitoring sales of the item during the predetermined time period for any incentive provided to consumers purchasing the item following the consummated final first transaction; and
    providing the consumer involved in the consummated final first transaction with a refund based on a money value of said incentive.

7. The method of claim 1 further comprising
    monitoring sales of the item during the predetermined time period for any incentive provided to consumers purchasing the item following the consummated final first transaction; and
    providing the consumer involved in the consummated final first transaction with a refund based on a money value of said incentive.

8. A business system for guaranteeing a consumer a best price on an item purchased from a vendor in a consummated final first transaction at a first price, the system comprising
    means for recording the first price and information identifying the consumer;
    means for monitoring the sales price of the item for a predetermined time period after purchase of the item by the consumer in the consummated final first transaction;
    means for noting any price lower than the first price for the item during the predetermined time period following the purchase of the item;
    means for calculating a money-value difference between the first price and said any price lower than the first price;
    means for refunding to an account of the consumer an amount equal to the money-value difference; and
    means for duplicating for the consumer any incentive accompanying sales of the item after the consummated final first transaction during the predetermined time period.

9. The business system of claim 8 further comprising
    a host system that includes the means for recording, means for monitoring, means for noting, and means for calculating.

10. The business system of claim 9 further comprising
    the host system also including the means for refunding.

11. The business system of claim 8 wherein the consumer conducts the consummated final first transaction with the vendor via the host system.

12. The business system of claim 8 further comprising
    means for determining a pertinent geographic area for the consummated final first transaction and for limiting the monitoring step to sales prices available within the pertinent geographic area.

13. The business system of claim 8 further comprising
    means for providing a warranty to the consumer.

14. In a business system with a magnetic strip card with consumer identifying information encoded thereon said information identifying a consumer desiring to conduct a transaction with a vendor, a host system that maintains information about discounts from said vendor, an apparatus for reading information on the magnetic strip card, said apparatus interconnected with and in communication with the host system, and means for applying any applicable discount related to said transaction for the benefit of said consumer, the improvement comprising means for guaranteeing a consumer a best price on an item purchased from the vendor in a consummated final first transaction at a first price; said means further comprising means for recording the first price and information identifying the consumer;

means for monitoring the sales price of the item for a predetermined time period after the purchase of the item by the consumer in the consummated final first transaction;

means for noting any price lower than the first price for the item during the predetermined time period, wherein only prices for the item to be sold by the vendor involved in the first transaction are taken into account;

means for calculating a money-value difference between the first price and said any price lower than the first price; and means for refunding to an account of the consumer an amount equal to the money-value difference.

\* \* \* \* \*